US008417273B2

United States Patent
Koo et al.

(10) Patent No.: US 8,417,273 B2
(45) Date of Patent: Apr. 9, 2013

(54) METHOD OF PERFORMING FEEDBACK FOR MULTICAST AND BROADCAST SERVICE

(75) Inventors: Ja Ho Koo, Anyang-si (KR); Su Nam Kim, Anyang-si (KR); Bin Chul Ihm, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/808,952

(22) PCT Filed: Dec. 17, 2008

(86) PCT No.: PCT/KR2008/007482
§ 371 (c)(1),
(2), (4) Date: Aug. 16, 2010

(87) PCT Pub. No.: WO2009/078666
PCT Pub. Date: Jun. 25, 2009

(65) Prior Publication Data
US 2010/0323737 A1      Dec. 23, 2010

Related U.S. Application Data

(60) Provisional application No. 61/014,444, filed on Dec. 18, 2007.

(30) Foreign Application Priority Data

Mar. 4, 2008   (KR) .................. 10-2008-0020144

(51) Int. Cl.
*H04W 72/04*   (2009.01)

(52) U.S. Cl. ........ 455/509; 455/446; 455/449; 455/429; 455/69; 455/24

(58) Field of Classification Search ........................ None
See application file for complete search history.

(56) References Cited

U.S. PATENT DOCUMENTS

2004/0151133 A1   8/2004   Yi et al.
2004/0224698 A1   11/2004  Yi et al.
(Continued)

OTHER PUBLICATIONS

Yu Chen; 'A Bandwidth Estimation Model for Multiplexed E-MBMS Services'; Vehicular Technology Conference, 2008. VTC 2008—Fall. IEEE 68th; Sep. 21-24, 2008; pp. 1-5.

*Primary Examiner* — Yuwen Pan
*Assistant Examiner* — Fanghwa Wang
(74) *Attorney, Agent, or Firm* — Mckenna Long & Aldridge LLP

(57) ABSTRACT

A method of performing a feedback for a multicast and broadcast service (MBS) is disclosed. A Multicast Broadcast Service (MBS) feedback method includes, generating, by a base station contained in a multi-cell multicast broadcast single frequency network (MBSFN) zone, a ranging channel code for a multicast broadcast service (MBS) feedback, allocating the ranging channel code to a mobile station contained in a cell zone of the base station, and receiving the MBS feedback information based on the ranging channel code from the mobile station. So, an adaptive modulation and coding (AMC) is applied to the MBS according to the NACK feedback, such that a throughput of the MBS system increases.

4 Claims, 10 Drawing Sheets

U.S. PATENT DOCUMENTS

| | | |
|---|---|---|
| 2005/0129058 A1 | 6/2005 | Casaccia et al. |
| 2007/0086367 A1* | 4/2007 | Sung et al. .................... 370/278 |
| 2007/0091881 A1* | 4/2007 | Kallio et al. .................. 370/389 |
| 2007/0104177 A1* | 5/2007 | Hwang et al. ................. 370/348 |
| 2007/0153724 A1* | 7/2007 | Cheon et al. .................. 370/328 |
| 2008/0025337 A1* | 1/2008 | Smith et al. ................... 370/439 |
| 2008/0049692 A1* | 2/2008 | Bachu et al. .................. 370/338 |
| 2008/0261573 A1 | 10/2008 | Kuo |
| 2009/0080351 A1* | 3/2009 | Ryu et al. ...................... 370/312 |
| 2011/0021224 A1* | 1/2011 | Koskinen et al. ............. 455/507 |

* cited by examiner

MBS feedback zone :

MBSFN zone :

US 8,417,273 B2

METHOD OF PERFORMING FEEDBACK FOR MULTICAST AND BROADCAST SERVICE

This application is a national phase application based on International Application No. PCT/KR2008/007482, filed on Dec. 17, 2008, which claims priority to U.S. Provisional Application No. 61/014,444, filed on Dec. 18, 2007 and Korean Patent Application No. 10-2008-0020144, filed on Mar. 4, 2008, all of which are incorporated by reference for all purposes as if fully set forth herein.

TECHNICAL FIELD

The present invention relates to a wireless access system, and more particularly to a method for performing a NACK feedback to improve a performance of a multicast and broadcast service system (hereinafter referred to as a multicast broadcast service).

BACKGROUND ART

A multicast broadcast service (MBS) is a point-t multipoint (PTM) service for transmitting data from one source to a plurality of receivers. This MBS transmits the same data to the plurality of receivers over a common radio frequency (RF) channel in order to effectively use radio resources.

In a general wireless access system, the MBS can be classified into two types of MBSs, i.e., a first-type MBS and a second-type MBS. The first-type MBS is a single-BS access scheme, such that data is provided by one base station in one cell. The second-type MBS is a multi-BS access scheme, allows several base stations to make a single MBS zone, such that the base stations provide the MBS service within the single MBS zone. In other words, the second-type MBS receives the same burst from an MBS server in several cells contained in the same MBS zone using a single MBS zone ID, such that it provides the MBS service using the received burst. Therefore, although a mobile station moves among cells having different base stations, this mobile station can acquire service continuity and a macro-diversity gain without performing a handover from one base station to another base station.

FIG. 1 is a conceptual diagram illustrating a reference model of an MBS for use in a broadband wireless access system.

Referring to FIG. 1, an MBS network includes a media server, an MBS distribution server, one or more base stations (BSs), and one or more mobile stations (MBs). This MBS media server provides the base stations with MBS data, and performs distribution of MS authentication and encryption keys associated with MBS contents. The MBS distribution server performs scheduling of MBS data transferred to several base stations (BSs). Optionally, the MBS distribution server may be omitted, and the MBS contents server may perform scheduling of the MBS data. The base station receives MBS data over a backbone network, and transmits the received MBS data to the mobile stations via a radio interface, and the mobile station receives the MBS data from the base station.

The MBS of the broadband wireless access system has the following features 1)~4).

1) Minimized-Power Consumption:

A mobile station can minimize an amount of power consumption while receiving MBS data, irrespective of a current operation mode (e.g., a normal-operation mode, a sleep mode, and an idle mode).

2) Mobility:

The mobile station is able to receive a seamless MBS connection while in motion among base stations.

3) MBS zone:

MBS contents are transferred via different MBS zones which are locally distinguished. MBS setup information (e.g., MBS connection ID, an encryption key, and a service ID) can be differently constructed in different MBS zones.

4) Security:

The MBS contents can be transferred to only authenticated users. An encryption key of a MAC PDU of MBS data can be equally applied to individual base stations contained in the MBS zone.

Next, the MBS zone will hereinafter be described in detail.

MBS-associated parameters (e.g., a security key and a multicast connection ID) may be differently established according to individual zones. The MBS contents can be broadcast in only a restricted zone. Therefore, when the mobile station receiving the MBS contents moves from one zone of one base station to another zone of another base station or is handed over from one base station to another base station, the mobile station must determine whether or not the stored MBS data is valid, and must determine whether or not it is able to continuously receive MBS contents.

Presently, if the base station provides the MBS via parameters different from those of MBS information owned by the mobile station, or does not transmit the MBS contents, the mobile station must access a new base station in order to update parameters associated with the MBS contents. In order to solve the above-mentioned problem, a broadband wireless access system manages the MBS zone in which one or more MBS provision base stations are grouped.

The base stations contained in the same MBS zone transmit the MBS contents to the mobile stations using the same MBS parameters. Also, the base stations transmit an ID of the MBS zone to the mobile station, such that this mobile station can recognize the MBS zone using this MBS-zone ID. The mobile station can immediately recognize whether or not the MBS parameter is valid using an MBS-zone ID received from the base station.

Also, if the mobile station moves to a zone of another base station within the same MBS zone, there is no need to perform a procedure for re-establishing MBS-associated parameters in order to receive MBS data. Also, the base stations contained in the same MBS zone transmit the MBS data using the same radio resources at the same time, such that MBS-data reception efficiency of the mobile stations can be increased by a Macro-diversity effect.

Operations for minimizing the amount of power consumption of the mobile stations receiving the MBS data will hereinafter be described in detail.

The mobile station can reduce the amount of power consumption during the reception time of MBS data, irrespective of current operation modes (e.g., a normal-operation mode, a sleep mode, and an idle mode).

Generally, a downlink MAP information element (DL-MAP IE) contained in a downlink MAP (DL-MAP) message is defined to indicate a burst transferred in a current frame. However, in order to receive the broadcast-formatted burst, the mobile station receives the DL-MAP message for each frame, and must decrypt the received DL-MAP message. In this case, the amount of power consumption cannot be decreased.

However, the MBS MAP information element (MB-S_MAP IE) informs the mobile station of the number of frames needed until transmitting the MBS-data burst, such that the mobile station may not decrypt a downlink frame including the DL-MAP message in association with a frame to which MBS data is not delivered. As a result, the mobile station can minimize an amount of power consumption. Specifically, the MBS_MAP IE can greatly reduce an amount of power consumption in a sleep-mode MS and an idle-mode MS. Scheduling information of the MBS data burst can be transferred via the MBS_MAP IE acting as one of DL-MAP IEs, and can also be transferred in the form of the MAC management message such as the MBS MAP message.

DISCLOSURE

Technical Problem

Accordingly, the present invention is directed to a method for performing a feedback for a multicast broadcast service that substantially obviates one or more problems due to limitations and disadvantages of the related art.

A multi-cell multicast broadcast single frequency network (MBSFN) is an exemplary service in which several base stations transmit the same MBS data at the same frequency such that an MBS zone is formed.

A general MBSFN system has no uplink feedback for the MBS, and provides a service according to a fixed modulation coding scheme (MCS). So, the base station provides the mobile station with a fixed or constant MBS service, irrespective of a channel situation. Also, the mobile stations having good channel situations always receive poor or bad services.

While a broadband wireless access system executes a service flow generation procedure for data transmission in a broadband wireless access system, the mobile station and the base station are designed to establish a connection to this service flow. In this case, the mobile station and the base station negotiate service quality parameters, and determine whether or not an automatic repeat request (ARQ) is applied to a corresponding connection. Also, in case of using a transport protocol, the mobile station and the base station transmit and receive parameters associated with transmission.

However, the broadband wireless access system refuses to carry out retransmission associated with MBS connection. Therefore, although the mobile station does not receive some MBS data from the base station due to deterioration of the channel environment or any errors occurred in received data (Rx data), the mobile station has no method for correcting these errors of the Rx data.

Also, the ARQ for use in the broadband wireless access system defines only transmission of a unicast connection between the mobile station and the base station. A burst profile (i.e., an FEC coding type or a modulation type) appropriate for channel conditions can be constructed on the basis of uplink/downlink signal quality states between the base station and the mobile station, such that the probability of receiving retransmitted data (ReTx data) can be increased.

However, MBS data is not equal to data which is unicast-transmitted from the base station to the specific mobile station. In other words, the MBS data is configured in the form of broadcast data, and this broadcast-format MBS data is transmitted to corresponding mobile stations controlled by the base station, such that it is difficult for each of all the mobile stations receiving the MBS data to receive a proper burst profile.

Also, a general MBSFN system has no uplink feedback for the MBS, and provides a service via a fixed MCS. However, in order to implement a higher performance of the MBS system, the MBSFN system requires a feedback of the MBS, and also requires an adaptive modulation and coding (AMC) method appropriate for the channel condition.

Also, a feedback system based on a general power control and random-power ramping technique has difficulty in accurately measuring a reception power level of a common RACH preamble detected by the influence of a geometry or multi-path, etc. Therefore, this feedback system has difficulty in accurately detecting the number of received MBS feedbacks.

The present invention is provided to solve the above-mentioned problems.

An object of the present invention devised to solve the problem lies on a method for maximizing a feedback detection performance during a multimedia and broadcast service (MBS).

Another object of the present invention devised to solve the problem lies on a method for employing an adaptive modulation and coding (AMC) technique using an NACK feedback to increase a performance of the MBS system, such that it can increase a transmission performance of the multimedia and broadcast service (MBS).

Technical Solution

In order to solve the above-mentioned technique objects, the present invention relates to a wireless access system, and more particularly to a method for performing an MBS NACK feedback in order to increase a performance of the MBS system.

The object of the present invention can be achieved by providing a Multicast Broadcast Service (MBS) feedback method comprising: generating, by a base station contained in a multi-cell multicast broadcast single frequency network (MBSFN) zone, a ranging channel code for a multicast broadcast service (MBS) feedback; allocating the ranging channel code to a mobile station contained in a cell zone of the base station; and receiving the MBS feedback information based on the ranging channel code from the mobile station.

The MBS feedback method may further comprise: adjusting a Modulation and Coding Scheme (MCS) level according to the MBS feedback information.

The MBS feedback method may further comprise: if the base station has a channel environment better than that of another base station contained in the MBSFN zone, further increasing the MCS level of the base station using a hierarchical modulation (HM) scheme.

The MBS feedback method may further comprise: periodically transmitting information of a frame, to which the ranging channel code is allocated, to each mobile station.

The MBS feedback method may further comprise: at the receiving of the MBS feedback information, if the base station does not receive the MBS feedback information in the frame, allowing the base station to re-receive the MBS feedback information from the mobile station after a lapse of a predetermined frame.

The MBS feedback may be a non-acknowledgment (NACK) feedback.

In another aspect of the present invention, provided herein is a Multicast Broadcast Service (MBS) feedback method comprising: generating, by a first-group base station among base stations contained in a multi-cell multicast broadcast single frequency network (MBSFN) zone, a ranging channel code for a multicast broadcast service (MBS) feedback; allocating the ranging channel code to a mobile station contained in a cell zone of the first-group base station; and receiving the MBS feedback information based on the ranging channel code from the mobile station.

The MBS feedback method may further comprise: after the receiving of the MBS feedback information, generating a ranging channel code for an MBS feedback by a second-group base station other than the first-group base station among several base stations contained in the MBSFN zone; allocating the ranging channel code to a mobile station contained in a cell zone of the second-group base station; and receiving the MBS feedback information based on the ranging channel code from the mobile station.

The MBS feedback method may further comprise: adjusting, by the first-group base station and the second-group base station, a Modulation and Coding Scheme (MCS) level of the MBSFN zone using the received MBS feedback information.

In another aspect of the present invention, provided herein is a Multicast Broadcast Service (MBS) feedback method comprising: generating, by specific base stations contained in a multi-cell multicast broadcast single frequency network (MBSFN) zone, a ranging channel code for a multicast broadcast service (MBS) feedback; grouping mobile stations contained in the MBSFN zone; allocating the ranging channel code to a mobile station, contained in a group managed by the specific base stations, among the grouped mobile stations; and receiving the MBS feedback information based on the ranging channel code from the mobile station contained in the group managed by the specific base stations.

The grouping of the mobile stations may be carried out using at least one of the number of ranging channel codes for the MBS feedback, the number of specific base stations, and the number of mobile stations contained in the MBSFN zone.

The length of a cyclic prefix (CP) for the MBS feedback may be longer than that of a general cyclic prefix. For example, the length of the cyclic prefix (CP) for the MBS feedback may be double that of the general CP.

In another aspect of the present invention, provided herein is a Multicast Broadcast Service (MBS) feedback method comprising: receiving a message having a ranging channel code for a multicast broadcast service (MBS) feedback from a base station contained in a multi-cell multicast broadcast single frequency network (MBSFN) zone; and transmitting MBS feedback information to the base station using the ranging channel code.

The MBS feedback method may further comprise: periodically receiving information of a frame, to which the ranging channel code is allocated, from the base station.

The MBS feedback information may be multicast broadcast service non-acknowledgement (MBS NACK) feedback information.

ADVANTAGEOUS EFFECTS

The present invention has the following effects.

First, the present invention provides an uplink NACK feedback channel for the MBS, such that it can minimize an amount of overhead of uplink resources and can maximize a feedback detection performance. Also, the present invention can correctly perform the NACK feedback.

Second, the present invention applies the AMC to the MBS on the basis of the NACK feedback, such that it can increase the performance of the MBS system. Also, the present invention applies a hierarchical modulation to a cell having a good channel environment in case of using the AMC, resulting in an increased system performance.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Mode for Invention

Figure 1:
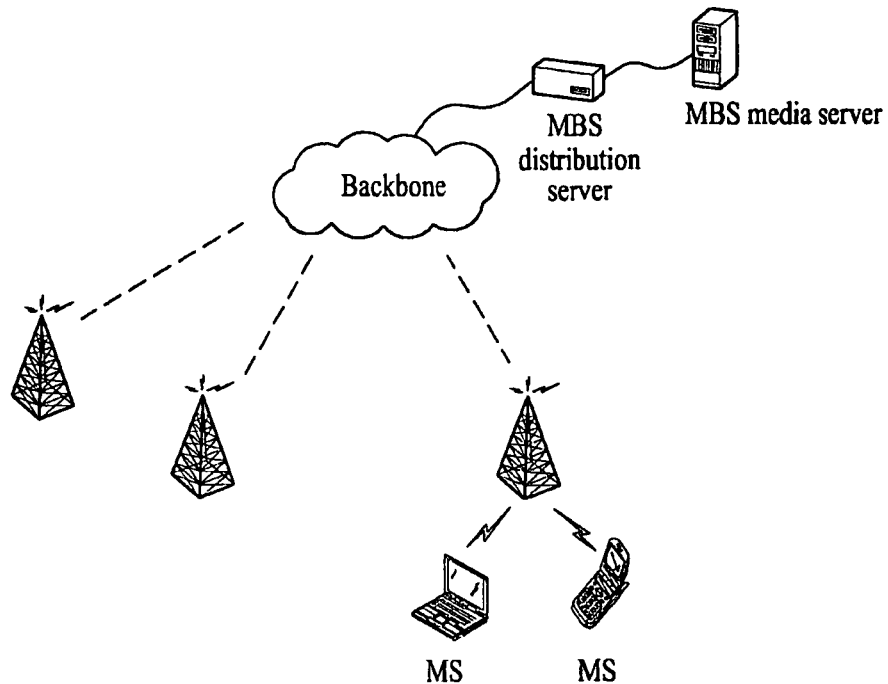
FIG. 1 is a conceptual diagram illustrating a reference model of an MBS for use in a broadband wireless access system.

Reference will now be made in detail to the preferred embodiments of the present invention, examples of which are illustrated in the accompanying drawings. Wherever possible, the same reference numbers will be used throughout the drawings to refer to the same or like parts.

The following embodiments of the present invention relate to a wireless communication system, and more particularly to an AMC method based on a NACK feedback method to improve a performance of a multicast and broadcast service (MBS) system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention are disclosed on the basis of a data communication relationship between a base station (or Node-B or eNode-B) and a user equipment (UE). In this case, the base station is used as a terminal node of a network via which the base station can directly communicate with the user equipment (UE). Specific operations to be conducted by the base station in the present invention may also be conducted by an upper node of the base station as necessary.

In other words, it will be obvious to those skilled in the art that various operations for enabling the base station to communicate with the user equipment (UE) in a network composed of several network nodes including the base station will be conducted by the base station or other network nodes other than the base station. The term "Base Station" may be replaced with a fixed station, Node-B, eNode-B (eNB), or an access point as necessary. The term "user equipment (UE)" may also be replaced with a user terminal, a mobile station (MS) or a mobile subscriber station (MSS) as necessary.

The following embodiments of the present invention can be implemented by hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The following embodiments of the present invention may be supported by standard documents disclosed in at least one of various wireless access systems, for example, the IEEE 802 system, the 3GPP system, the 3GPP LTE system, and the 3GPP2 system. In other words, unexplained steps or parts for definitely disclosing the technical idea of the present invention may be supported by the above-mentioned documents. Also, all the terms or terminologies disclosed in the present invention may be explained by the above-mentioned standard documents.

Prior to describing the present invention, it should be noted that specific terms disclosed in the present invention are proposed for the convenience of description and better understanding of the present invention, and the use of these specific terms may be changed to another format within the technical scope or spirit of the present invention.

For the convenience of description, the IEEE 802.16 system will hereinafter be used as an example of the wireless system. Needless to say, it should be noted that the present invention can also be applied to other wireless access systems (e.g., 3GPP LTE) within the technical scope of the present invention.

An uplink feedback method for use in the present invention can be classified into a NACK feedback method and a CQI feedback method. For the convenience of description, the present invention will be described on the basis of only the NACK feedback method. Needless to say, the same technical idea as that of the NACK feedback method can also be applied to the CQI feedback method.

The feedback type can be generally classified into a higher signaling type, a channel quality information (CQI) type, and a NACK feedback type. From the viewpoint of uplink overhead, the NACK feedback type is preferred more than the remaining types.

The feedback allocation for the MBSFN may consider the following two scenarios.

According to a first scenario, a feedback channel is allocated to a mobile station capable of simultaneously receiving a unicast service and MBS data. In this case, the mobile station is able to transmit the NACK feedback of 1 bit using uplink resources used for the conventional unicast scheme. The unicast uplink resources may be a header, ACK/NACK channels or a CQI channel.

According to a second scenario, a feedback channel may be allocated to a mobile station capable of receiving only MBS data. For the mobile station receiving only the MBS, a ranging channel can be used as a feedback channel for the NACK feedback. The scenario considered in the present invention is a mixed MBS based on multiple cells (i.e., a multi-cell).

Figure 2:
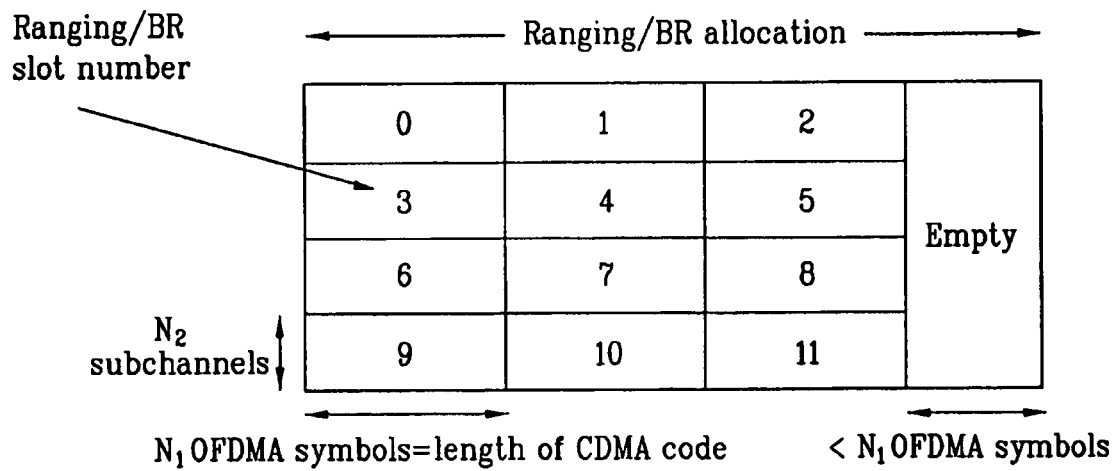
FIG. 2 is a conceptual diagram illustrating a ranging channel according to the present invention.

FIG. 2 is conceptual diagram illustrating a ranging channel according to the present invention.

In FIG. 2, a horizontal axis is an orthogonal frequency division multiple access (OFDM) symbol unit, and a vertical axis is a sub-channel unit. In other words, the horizontal axis may be denoted by time units, and the vertical axis may be denoted by frequency units. In this case, the number of OFDMA symbols is equal to the length of CDMA code.

The magnitude of the CDMA ranging or the ranging opportunity of bandwidth request (BR) allocation is represented by $N_1$ used as a symbol number needed to transmit the corresponding ranging and the BR code. Also, $N_2$ is indicative of the number of sub-channels needed to transmit the ranging code. It should be noted that the magnitude $N_1$ of opportunity of each ranging allocation is fixed.

The raging allocation area is divided into slots denoted by "OFDMA symbol (N1)×Sub-channels (N2)", and has priority on its time axis. In other words, a first ranging begins at a first sub-channel of a first symbol, the next ranging processes of the first ranging are arranged in ascending numerical orders in the sub-channel in the range from a current sub-channel to a slot of $N_1$. Individual CDMA codes are transmitted to an initial part of the corresponding slot as shown in FIG. 2.

Figure 3:
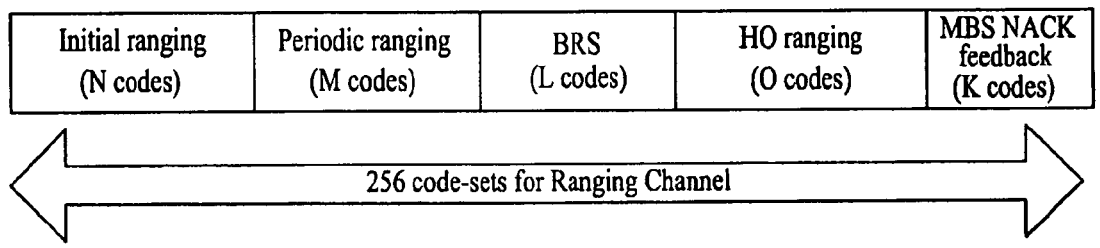
FIG. 3 is a conceptual diagram illustrating a method for allocating a NACK feedback channel code for the MBS in the ranging channel according to the present invention.

FIG. 3 is a conceptual diagram illustrating a method for allocating a NACK feedback channel code for the MBS in the ranging channel according to the present invention.

In this embodiment of the present invention, a NACK feedback channel for the mobile station employing only the MBS is able to use the ranging channel. In the IEEE 802.16 system, the ranging channel includes 256 codes, and usages of the conventional ranging channel code are as follows.

Referring to FIG. 3, N codes are allocated for an initial ranging, M codes are allocated for a periodic ranging, L codes are allocated for a bandwidth request (BR) ranging, and no codes (0 code) are allocated for a handover (HO) ranging. In this case, all 256 ranging channel codes are not used for the initial ranging, the periodic ranging, the bandwidth request (BR) ranging, and the handover (HO) ranging).

Therefore, in the case of using extra ranging codes for the MBS NACK feedback, the feedback can be carried out without any overhead in the uplink. In other words, the base station can allocate a predetermined number of ranging codes (e.g., K ranging codes) from among 256 ranging codes to the mobile station so as to carry out the MBS NACK feedback.

The base station transmits ranging-code information for the MBS NACK feedback to the mobile station using an uplink channel describer denoted by 'UCD PHY-specific channel encodings'. The uplink channel describer can be provided to the mobile station at intervals of a maximum of 10 s (i.e., a very long time). In other words, the number of uplink channel codes allocated for the MBS NACK feedback is adjusted to be a long term. If the number of mobile stations contained in one cell is very high, many more slots for the ranging channel are allocated via the UL-MAP, such that a collision between the mobile stations can be solved.

There are three methods for allocating the NACK feedback channel. The NACK feedback can be carried out using one of the three methods.

Figure 4:
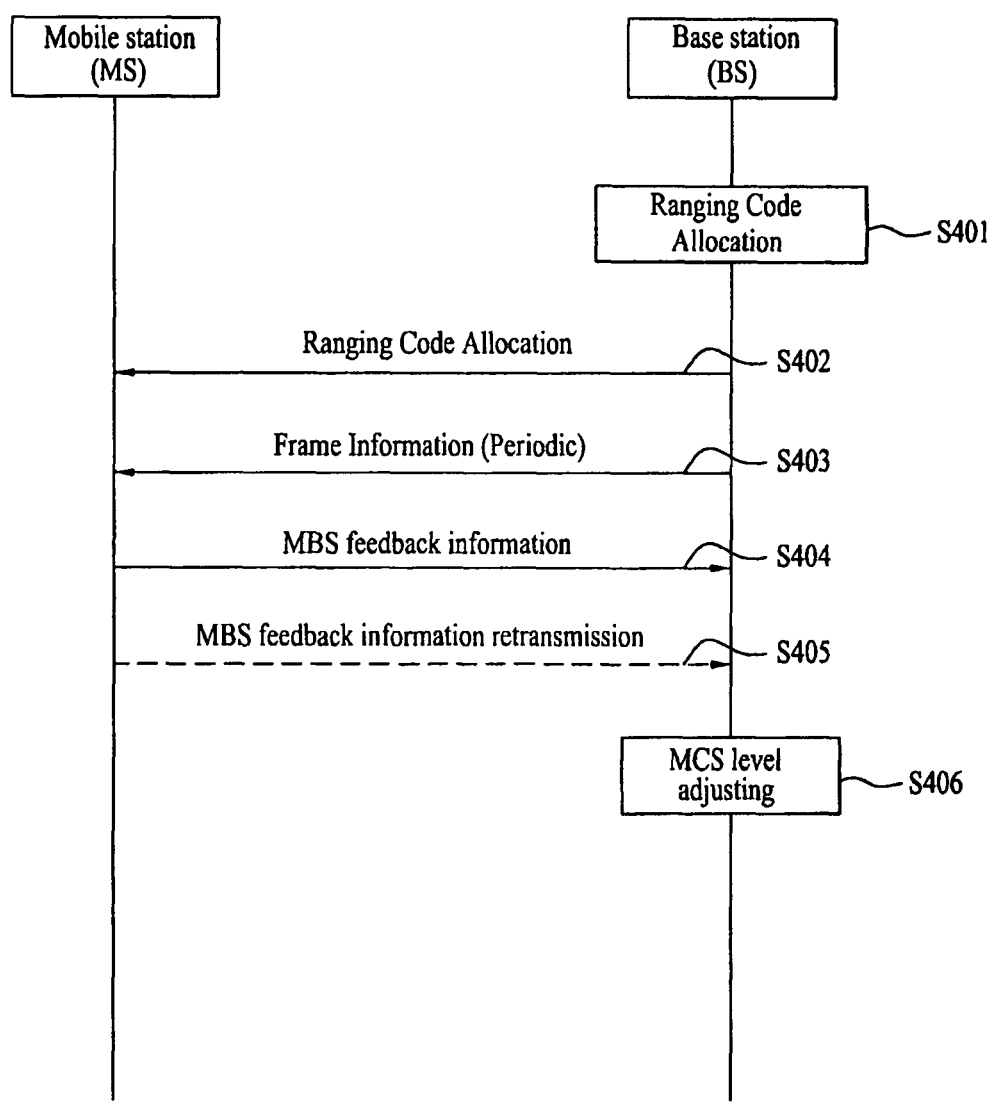
FIG. 4 is a flow chart illustrating a method for allocating a ranging channel code for the MBS NACK feedback by all base stations contained in an MBSFN zone according to the present invention.

FIG. 4 is a flow chart illustrating a method for allocating a ranging channel code for the MBS NACK feedback by all base stations contained in an MBSFN zone according to the present invention.

Referring to FIG. 4, the base station forms the MBSFN zone, and transmits the MBS to each mobile station contained in a cell zone of the base station itself. Each of all base stations contained in the MBSFN zone generates K channel codes to carry out the MBS NACK feedback. In this case, the same number of ranging channel codes can be generated from all the base stations, or the individual base stations may generate different numbers of ranging channel codes according to a channel environment and a mobile station (MS) situation. The method of FIG. 3 can be applied to a method for generating the ranging channel code at step S401.

Each base station can allocate the ranging code for the MBS NACK feedback to the mobile stations contained in its own cell zone at step S402.

Each base station is able to transmit information of a frame to which the above ranging code is allocated to the mobile stations, and the corresponding frame information can be periodically transmitted. Also, the frame information can be transmitted when the ranging channel for the NACK feedback is changed to another. In this case, the frame information includes timing information of the frame to which the ranging code is allocated at step S403.

If the mobile station confirms the frame information to which the ranging code is allocated, it can transmit the MBS feedback information to the base station using the ranging code received from the corresponding frame at step S404.

If the base station has abnormally received the NACK feedback information, the mobile station can retry to retransmit the NACK feedback using the same feedback channel code after the lapse of a predetermined frame at step S405.

The above step S405 is optional. This step S405 can be carried out only when the feedback information is not normally transmitted. Moreover, the probability of generating the MBS NACK feedback is low, such that a collision between the same codes may be considered to be one NACK feedback.

The base station collects NACK feedback information transmitted from each mobile station. An upper layer can perform the AMC (Adaptive Modulation and Coding) using the NACK feedback information collected by individual base stations. The base station can adjust the MBS's MCS level on the basis of the MCS level received from the upper layer at step S406.

After the AMC has been applied to the MBSFN zone at step S406, the MBS channel situation for each cell can be recognized. Therefore, a hierarchical modulation (HM) can be applied to a cell having a good channel condition. A service having a higher MCS level can be provided to this cell of the good channel condition.

Referring to FIG. 4, the MBS can be processed by a Time Division Multiplexing (TDM) scheme. In other words, different MBSs (e.g., MBS1, MBS2, . . . ) can be fed back via a ranging channel for the MBS NACK feedback of different predetermined frames. As a result, an accurate NACK feedback can be detected, and the AMC can be applied to the MBSFN zone.

According to a time division duplexing (TDD) scheme, 6 sub-channels for the ranging channel are needed in one frame. A total of 630 sub-channels (35×18=630) exist in each frame, simultaneous opening of the 6 ranging channels for the MBS NACK feedback is not operated as a large amount of overhead.

Figure 5:
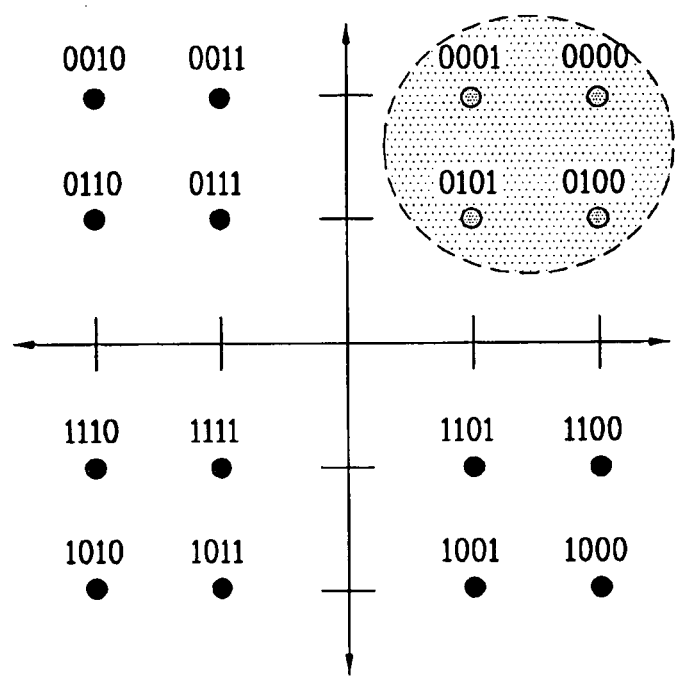
FIG. 5 shows a bitmap applied to hierarchical modulation according to the present invention.

FIG. 5 shows a bitmap applied to hierarchical modulation (HM) according to the present invention.

Referring to FIG. 5, a data stream can be divided into two streams during the hierarchical modulation. In other words, the data stream can be divided into a high priority (HP) and a low priority (LP). In this case, the LP may be contained in the HP. Therefore, the mobile station having a good channel condition can recognize two streams, but the other mobile station having a poor channel condition can recognize only the HP.

Detailed descriptions thereof will hereinafter be described with reference to the 16-QAM scheme. In case of the data stream for use in the 16-QAM scheme, 2 bits (i.e., odd bits among 4 bits) corresponding to the HP are combined with other 2 bits (i.e., even bits among 4 bits) corresponding to the LP, and the combined result is mapped to a uniform or non-uniform 16-QAM constellation.

In FIG. 5, bits corresponding to the HP may decide a quadrant of the constellation, and other bits corresponding to the LP may decide a specific point of a quadrant selected by the HP. This hierarchical modulation (HM) scheme may be applied to not only the QPSK and 16-QAM schemes but also the 64-QAM scheme.

Each base station in one MBSFN zone must provide the MBS at the same MCS level. If each base station in one MBSFN zone does not provide the MBS at the same MCS level, the base station is unable to carry out a radio frequency (RF) combining. However, the base station can provide the mobile station of a good channel condition with a service having a higher MCS level according to the HM scheme. In more detail, if the HM scheme of FIG. 5 is applied to the method of FIG. 4, the MBS can be effectively provided according to a channel condition and each cell's environment.

Figure 6:
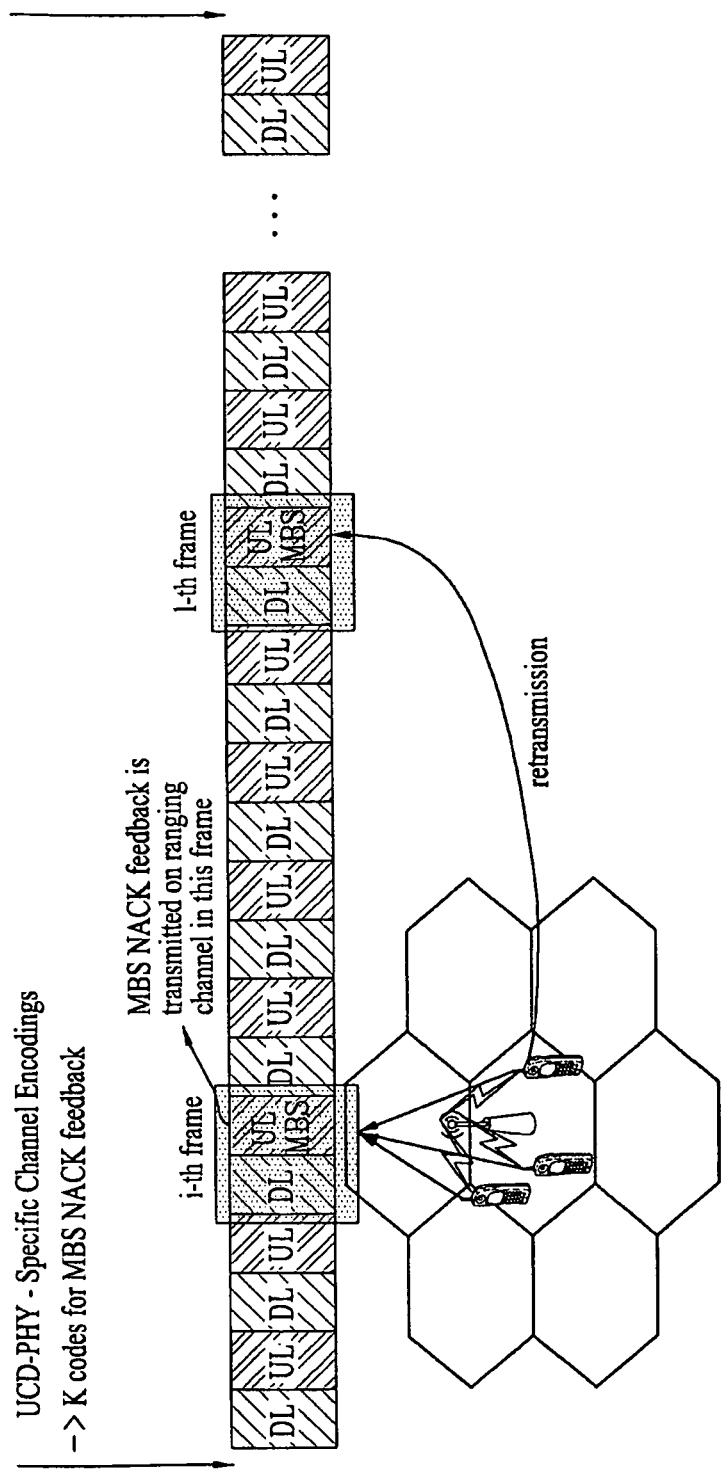
FIG. 6 is a conceptual diagram illustrating a method for allocating the NACK feedback channel according to the present invention.

FIG. 6 is a conceptual diagram illustrating a method for allocating the NACK feedback channel according to the present invention.

Referring to FIG. 6, the base station can allocate ranging channel codes (K codes) for the NACK feedback to each mobile station using a UCD PHY message. In this case, each mobile station and the base station may have information of the frame to which the above ranging channel codes have been allocated. However, the base station may periodically inform the mobile station of this frame information.

Therefore, each mobile station can transmit MBS NACK feedback information over an uplink ranging channel of an i-th frame (e.g., a frame to which the ranging channel code is allocated). If the mobile station abnormally transmits the NACK feedback information, the mobile station reuses the ranging channel code after the lapse of a predetermined frame (e.g., '1' frame) and retransmits the NACK feedback information.

Figure 7:
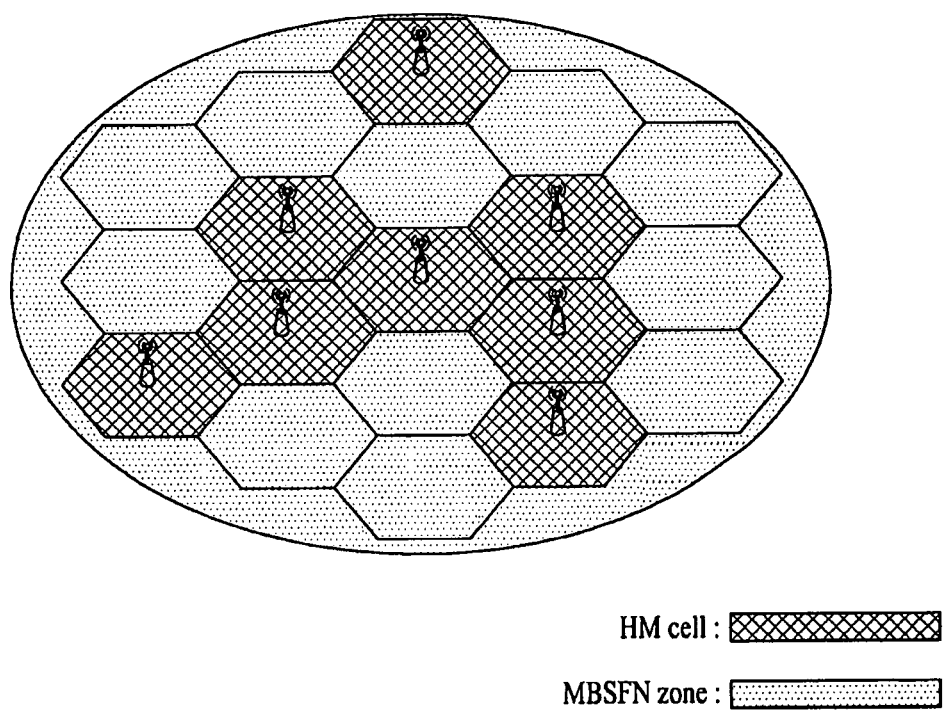
FIG. 7 is a conceptual diagram illustrating an MBSFN zone formed when the AMC is applied and the hierarchical modulation is then applied after the NACK feedback information has been received.

FIG. 7 is a conceptual diagram illustrating an MBSFN zone formed when the AMC is applied and the hierarchical modulation is then applied after the NACK feedback information has been received.

Referring to FIG. 7, the base station contained in the MBSFN zone allocates the MBS NACK feedback channel to each mobile station, receives MBS feedback information from each mobile station, and adjusts the MCS level.

However, some base stations among all base stations contained in the entire MBSFN zone may have good channel conditions, and other base stations may have poor channel conditions. In this case, provided that the MCS level is equally adjusted on the basis of a cell of a poor channel environment, other base stations having good channel conditions have to use the low MCS level, resulting in the occurrence of wasted radio resources.

Therefore, if the hierarchical modulation (HM) is applied to this embodiment of the present invention, the base stations having good channel environments can provide each mobile station with the MBS using the high MCS level. In other words, the base stations having good channel conditions are selected, the hierarchical modulation (See FIG. 5) is applied to the selected base stations, and effective services can be applied to the selected base stations.

Figure 8:
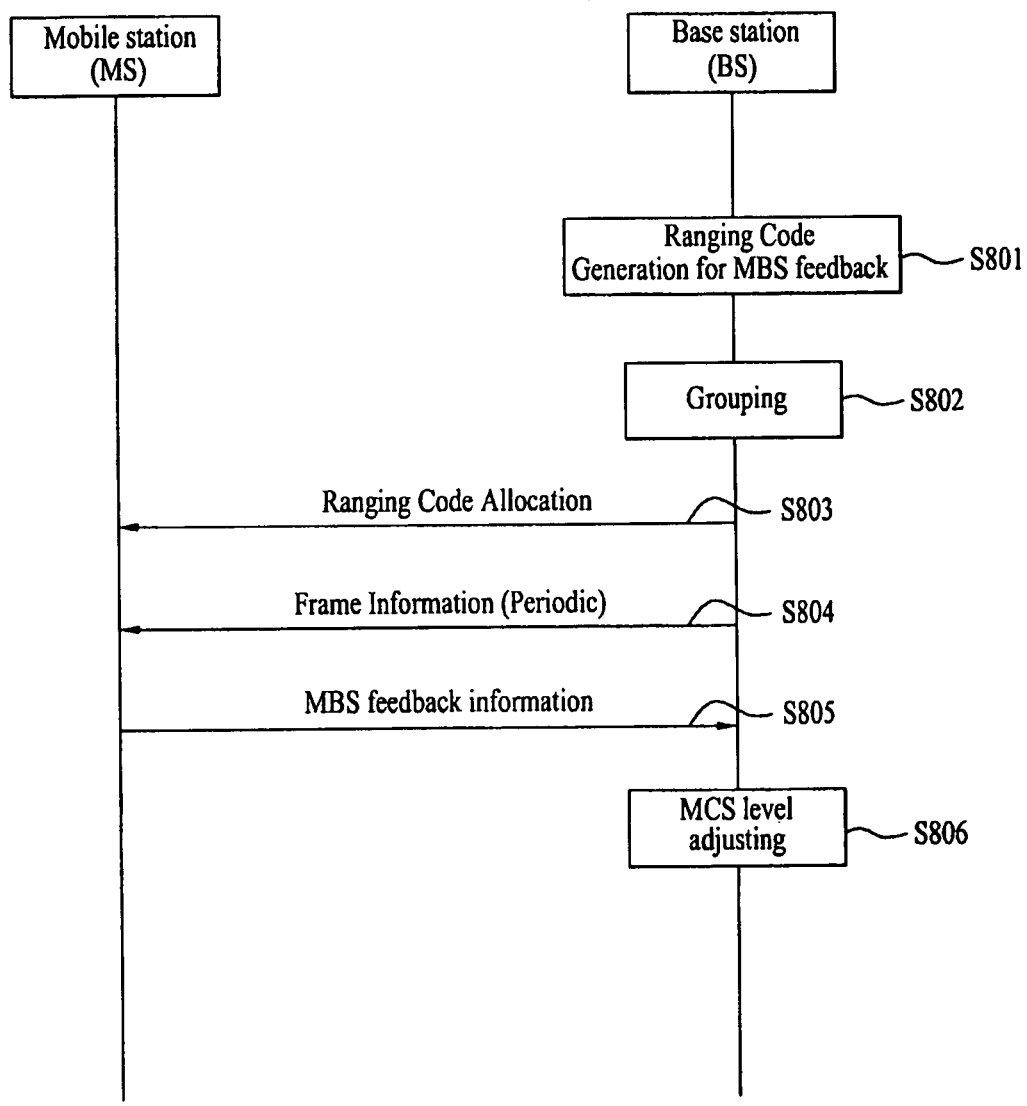
FIG. 8 is a flow chart illustrating a method for allowing all base stations contained in the MBSFN zone to allocate a ranging channel code in order to perform the MBS NACK feedback.

FIG. 8 is a flow chart illustrating a method for allowing base stations contained in the MBSFN zone to allocate a ranging channel code in order to perform the MBS NACK feedback.

Referring to FIG. 8, only a predetermined number of base stations (e.g., P base stations) among all base stations contained in the MBSFN zone are used for the NACK feedback for the MBS. In other words, only some base stations (e.g., P base stations) contained in the MBSFN zone can generate the ranging code for the MBS NACK feedback.

For example, provided that two tiers are used, one MBSFN zone may have 57 base stations. P base stations among 57 base stations may generate different ranging codes. In case of using the method of FIG. 3, P base stations may generate K ranging codes among 256 ranging code sets to carry out the MBS feedback at step S801.

P base stations allow all mobile stations contained in the MBSFN zone to process the MBS NACK feedback information transmitted via the MBS feedback channel. In this case, a zone controlled by each of P base stations may be called an MBS feedback zone. Therefore, P base stations perform grouping of mobile stations contained in the MBS feedback zone controlled by the individual base stations. In this case, the grouping size may be decided by the number of mobile stations contained in one MBS feedback zone, the number of feedback codes, or the number of base stations (e.g., P base stations) at step S802.

At step S802, P MBS feedback zones are generated in one MBSFN zone. Also, the length of a cyclic prefix (CP) for the MBS NACK feedback transmitted to the ranging channel may be decided. The CP length for the MBS NACK feedback must be longer than a conventional CP length because all cells of the MBSFN zone must be controlled by the P base stations. This relationship may be represented by a long CP. A predetermined number of base stations capable of controlling the MBSFN zone may be decided by the length of the long CP. Although the long-CP length is generally longer than the length of a general CP, it should be noted that the long-CP length which is twice the general-CP length can be sufficiently used without any problems.

P base stations may allocate the MBS feedback ranging codes to mobile stations contained in each MBS feedback zone at step S803.

Also, each base station can periodically transmit information of the frame, to which the ranging code for the MBS feedback has been allocated, to the mobile station contained in the MBS feedback zone at step S804.

Each mobile station can transmit the MBS feedback information to each base station via the MBS NACK feedback channel within the allocated frame at step S805.

Each of the P base stations can collect the NACK feedback information transferred from the mobile station. An upper layer can carry out the AMC process using the NACK feedback information collected by the P base stations. The P base stations can adjust the MBS's MCS level on the basis of the MCS level received from the upper layer at step S806.

Figure 9:
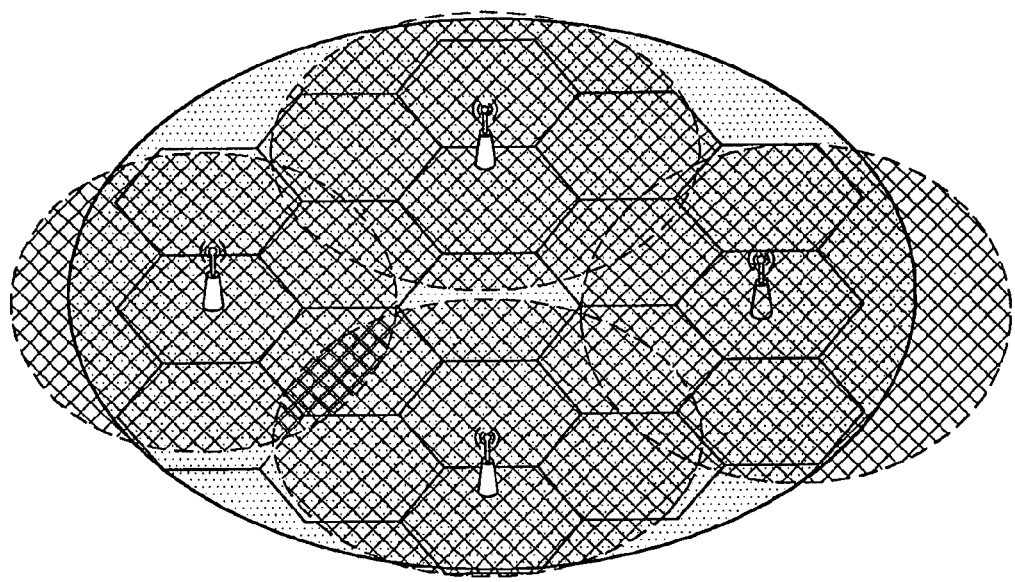
FIG. 9 shows an MBS feedback zone contained in the MBSFN zone according to the present invention.
Figure 9:
Figure 9:
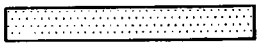

FIG. 9 shows an MBS feedback zone contained in the MBSFN zone according to the present invention.

Referring to FIG. 9, the entire MBSFN zone may include a predetermined number of MBS feedback zones. In this case, each MBS feedback zone may be denoted by a dotted line and a lattice. In FIG. 9, only a predetermined number of base stations (e.g., P base stations) among all base stations contained in the MBSFN zone may be used for the MBS NACK feedback. In other words, one MBS feedback zone may include one or more base stations, but the number of base stations capable of carrying out the MBS feedback is only one (i.e., 1).

FIG. 9 assumes that the number of base stations capable of carrying out the MBS feedback is 4.

Each of four base stations generates K ranging codes for the MBS feedback. Also, each base station performs grouping on the mobile station contained in one MBS feedback zone, such that it can detect an accurate feedback using K codes. In this case, the grouping size may be decided by the number of mobile stations contained in one MBS feedback zone, the number of MBS NACK feedbacks, and the number of base stations carrying out the MBS feedback.

After performing the grouping, each base station allocates the MBS feedback channel code to the mobile station contained in each group. The mobile stations which are assigned the MBS feedback channel code can transmit the NACK feedback information in different frames. In other words, the TDM scheme is applied between groups, and the CDM scheme may be partially applied to the mobile stations contained in the groups. In this case, K codes allocated to individual groups need not satisfy all the numbers of mobile stations. The probability of generating the MBS NACK feedback is very low, such that a collision between the same MBS feedback codes may be considered to be one NACK feedback.

Figure 10:
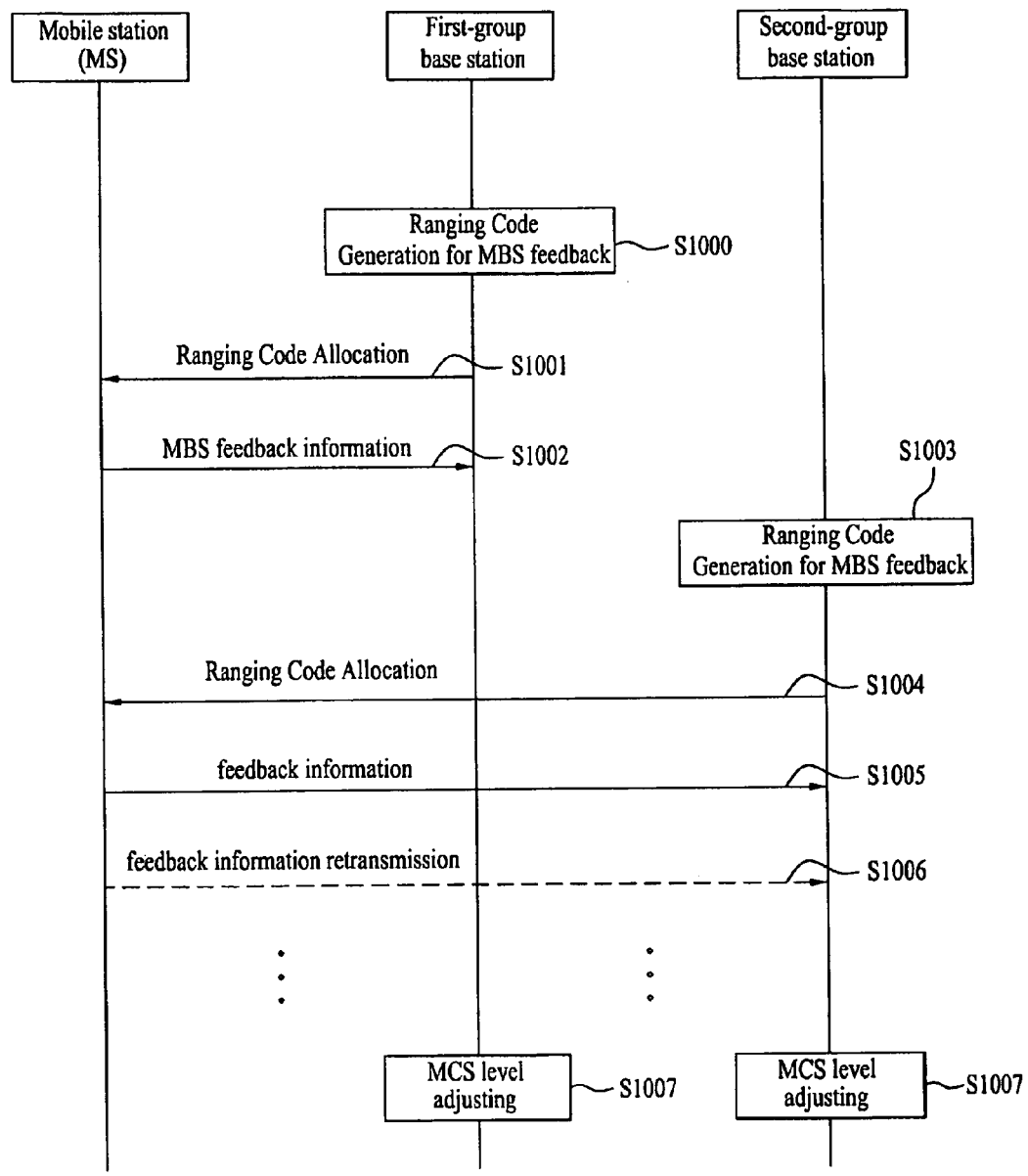
FIG. 10 is a flow chart illustrating a method for allowing the base station contained in the MBSFN zone to allocate a ranging channel code in order to sequentially perform the MBS NACK feedback according to one embodiment of the present invention.

FIG. 10 is a flow chart illustrating a method for allowing the base station contained in the MBSFN zone to allocate a ranging channel code in order to sequentially perform the MBS NACK feedback according to one embodiment of the present invention.

If all the mobile stations contained in the MBSFN zone simultaneously perform the MBS feedback, the interference between the mobile stations may unavoidably increase. Therefore, another embodiment of the present invention provides a method for sequentially opening the ranging channels for the MBS feedback according to a predetermined rule, instead of simultaneously opening the ranging channel for the MBS NACK feedback by all the base stations.

Still another embodiment of the present invention may also consider a method for generating and allocating the ranging channels for the sequential MBS feedback. For example, some base stations having similar channel environments among all base stations contained in the MBSFN zone are combined in one group, such that the MBS feedbacks of individual groups can be sequentially carried out. In this case, the number of groups may be at least one, and may also be changed according to a user request.

In FIG. 10, some base stations contained in a first group are called a first-group base station, other base stations contained in a second group are called a second-group base station. The mobile station (MS) may be one or more base stations (MSs), and may indicate the entire set of mobile stations contained in the MBSFN zone. In other words, if the mobile station performs necessary operations along with the first-group base station, the MS of FIG. 10 indicates mobile stations contained in a cell zone of the first-group base station. If the mobile station performs necessary operations along with the second-group base station, the MS of FIG. 10 indicates mobile stations contained in a cell zone of the second-group base station Referring to FIG. 10, the first-group base station generates ranging codes for the MBS feedback. In this case, the ranging codes may be set to the K ranging codes shown in FIG. 3. Also, the base stations contained in the first-group base station may generate K different ranging codes at step S1000.

The first-group base station may allocate the K ranging codes to the mobile station contained in the cell zone of the first-group base station at step S1001.

At step S1001, information of the frame to which the ranging codes have been allocated may be pre-recognized by the first-group base station and the mobile station as necessary. Also, the first-group base station may periodically transmit the frame information for the NACK feedback to the mobile station.

The first-group base station may receive the MBS feedback information of the mobile stations contained in the cell zone of the first-group base station via the allocated MBS feedback channel at step S1002.

If the first-group base station acquires all the MBS feedback information, the second-group base station may generate the ranging codes for the MBS feedback. The MBS feedback codes generated by the second-group base station may refer to those of FIG. 3 at step S1003.

The second-group base station may allocate the ranging codes generated for the feedback to the mobile stations contained in the cell zone of the second-group base station at step S1004.

At step S1005, the mobile station contained in the cell zone of the second-group base station may transmit the MBS feedback information to the second-group base station using the ranging codes, which have been allocated at step S1004.

If the feedback information transferred from each mobile station is abnormally transmitted to the second-group, the mobile station can retransmit the feedback information to the second-group base station after the lapse of a predetermined frame at step S1006.

The above steps S1000 to S1006 may be repeated until all the mobile stations contained in the MBSFN zone perform the NACK feedback. After the MBS NACK feedback is performed on all the cells, the NACK feedback information transmitted to each base station is collected in the upper layer over a backbone network. The MCS level of the MBSFN zone may be adjusted in the upper layer according to the MBS feedback information of each mobile station. Each group base station may adjust the MCS level according to the MCS level adjusted by the upper layer at step S1007.

Figure 11:
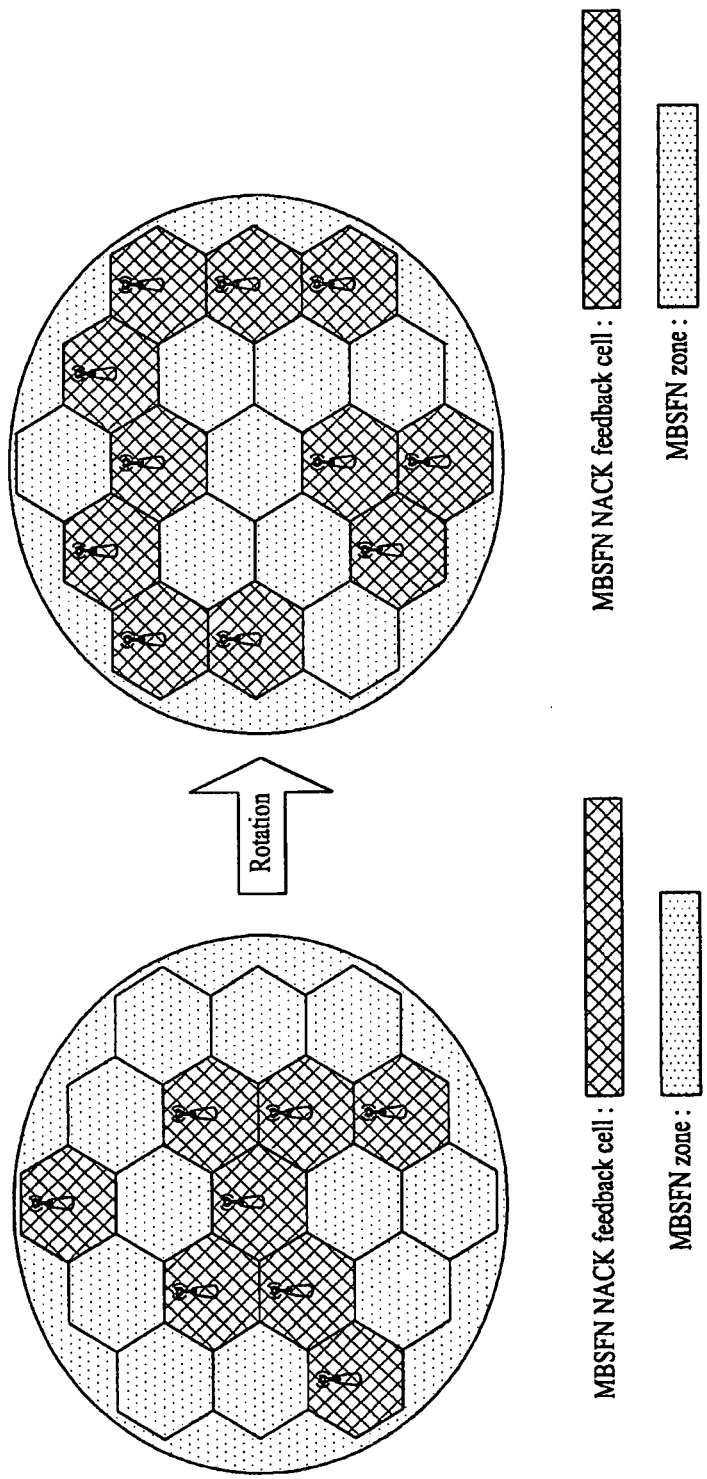
FIG. 11 is a flow chart illustrating a method for allowing the base station contained in the MBSFN zone to allocate a ranging channel code in order to sequentially perform the MBS NACK feedback according to another embodiment of the present invention.

FIG. 11 is a flow chart illustrating a method for allowing the base station contained in the MBSFN zone to allocate a ranging channel code in order to sequentially perform the MBS NACK feedback according to another embodiment of the present invention.

FIG. 11 illustrates a method for applying the method of FIG. 10. In this case, base stations contained in the MBSFN zone are divided into two groups, and the base stations contained in each group sequentially carry out the MBS feedback.

All cells of the base stations contained in each group may be called 'MBSFN NACK feedback cells'. FIG. 11 shows a method for sequentially changing the MBS NACK feedback cells, receiving the MBS feedback information from the mobile station contained in each cell, and adjusting the MCS level using the MBS feedback information.

In FIG. 11, the number of cells to be contained in each MBS NACK feedback cell, and the number of process times to be applied to the present invention may be changed according to a user request or a communication environment.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Therefore, the above-mentioned detailed description must be considered for only illustrative purposes instead of restrictive purposes. The scope of the present invention must be decided by a rational analysis of claims, and all modifications within equivalent ranges of the present invention are contained in the scope of the present invention. It is obvious to those skilled in the art that claims having no explicit citation relationships are combined with each other to implement the embodiments, or new claims obtained by the amendment after the patent application may also be contained in the present invention without departing from the scope and spirit of the present invention.

[Industrial Applicability]

As apparent from the above description, the embodiments of the present invention can be applied to various wireless access systems, for example, a 3rd Generation Partnership Project (3GPP), a 3GPP2 and/or an Institute of Electrical and Electronic Engineers 802 (IEEE 802.xx) system. Embodiments of the present invention can be applied to not only the above various wireless access system, but also all the technical fields formed by the application of the various wireless access systems.

The invention claimed is:

1. A Multicast Broadcast Service (MBS) non-acknowledgment (NACK) feedback method comprising:
generating, by a specific base station among a plurality of base stations in a MBS feedback zone of a multi-cell multicast broadcast single frequency network (MBSFN) zone, a ranging channel code for MBS feedback;
grouping mobile stations contained in the MBS feedback zone;
allocating the ranging channel code to a mobile station; and
receiving the MBS feedback based on the ranging channel code from the mobile station,
wherein the MBSFN zone includes more than one MBS feedback zone, and
wherein the specific base station is configured to receive MBS feedback as a representative for the plurality of base stations in the MBS feedback zone.

2. The MBS NACK feedback method according to claim 1, wherein the grouping of the mobile stations is carried out using at least one of the number of ranging channel codes for the MBS feedback, the number of specific base stations, and the number of mobile stations contained in the MBS feedback zone.

3. The MBS NACK feedback method according to claim 1, further comprising:
   adjusting a modulation and coding scheme (MCS) level according to the MBS feedback.

4. The MBS NACK feedback method according to claim 1, wherein a length of a cyclic prefix for the MBS feedback is longer than that of a general cyclic prefix.

\* \* \* \* \*